(12) United States Patent
Churchett

(10) Patent No.: US 6,641,271 B1
(45) Date of Patent: Nov. 4, 2003

(54) LOAD SUPPORT FOR A WING MIRROR

(75) Inventor: Andrew John Churchett, Lonsdale (AU)

(73) Assignee: Schefenacker Vision Systems Australia Pty Ltd, Lonsdale (AU)

( * ) Notice: Subject to any disclaimer, the term of this patent is extended or adjusted under 35 U.S.C. 154(b) by 0 days.

(21) Appl. No.: 10/030,575

(22) PCT Filed: Jul. 6, 2000

(86) PCT No.: PCT/AU00/00815

§ 371 (c)(1),
(2), (4) Date: May 28, 2002

(87) PCT Pub. No.: WO01/03974

PCT Pub. Date: Jan. 18, 2001

(30) Foreign Application Priority Data

Jul. 8, 1999 (AU) .............................................. PQ 1474

(51) Int. Cl.⁷ ........................... B60R 1/06; B60R 1/076; G02B 7/18
(52) U.S. Cl. .................... 359/841; 359/872; 248/475.1; 248/476; 248/479; 248/900
(58) Field of Search ................................. 359/841, 877, 359/872, 873, 874, 875, 876; 248/475.1, 476, 479, 900

(56) References Cited

U.S. PATENT DOCUMENTS

| | | | |
|---|---|---|---|
| 4,697,065 A | | 9/1987 | Ishitsubo et al. |
| 5,245,480 A | | 9/1993 | Polzer ......................... 359/841 |
| 5,432,640 A | * | 7/1995 | Gilbert et al. .............. 359/841 |
| 5,867,328 A | * | 2/1999 | Stapp et al. ................. 359/841 |

FOREIGN PATENT DOCUMENTS

| | | |
|---|---|---|
| AU | A-68997/98 | 5/1998 |
| EP | 0 644 084 A1 * | 3/1995 |

* cited by examiner

Primary Examiner—John Juba
(74) Attorney, Agent, or Firm—Warn, Burgess & Hoffmann, P.C.

(57) ABSTRACT

A sideview mirror for a vehicle. A pivot assembly is provided between the mirror head and the mounting bracket. The pivot assembly allows the mirror head to pivotally rotate with respect to the mounting bracket. A load support structure provides a design to provide improved resistance to cantilever forces imposed on the mirror.

18 Claims, 2 Drawing Sheets

LOAD SUPPORT FOR A WING MIRROR

CROSS-REFERENCE TO RELATED APPLICATIONS

This application is a National Stage of International Application No. PCT/AU00/00815, filed Jul. 6, 2000.

FIELD OF THE INVENTION

This invention relates to a wing mirror for a motor vehicle, and in particular to a structure for supporting cantilever loads applied to the wing mirror.

BACKGROUND OF THE INVENTION

Modern wing mirrors for motor vehicles are designed so that they pivotally attach to a vehicle mounting bracket. This pivotal attachment is normally via a vertical spigot on the mounting bracket. The mounting bracket has a base surface surrounding the spigot which supports the mirror head and various detents used to hold the mirror head in the required position. The mirror head is provided with necessary bearing surfaces to enable it to rotate with respect to the spigot. A coil spring is normally used to hold the mirror head against the base surface and any detents that may be located between the mirror head and base surface. The coil spring acts between the mirror head and a retainer that is normally fitted to the end of the spigot.

Such arrangements enable the mirror head to be moved to a park position or enable it to break away upon impact forces being applied.

In addition to manual movement of mirror heads, it has become common to provide electric drive means to automatically move the mirror from a deployed or operating position to a park position where the mirror is moved alongside the vehicle. Again, these mechanisms normally rely on a spigot secured to a mounting bracket about which the mirror head rotates.

A design requirement for wing mirrors is to be able to withstand cantilever loads which are applied at the outermost point of the mirror head. Vehicle manufacturers normally specify the static load which a mirror head must be able to withstand.

This cantilever load results in the mirror head tending to rotate about a horizontal axis. The centre of rotation will normally be the outer edge of the base surface of the mounting bracket which in turn will result in some compression of any coil spring. In turn, the mirror housing will come into contact with the spigot and apply a side loading. This side loading causes a bending strain within the spigot.

Alternatively, if the mirror has an electric drive means, the side loading force may be applied to the drive mechanism.

In most mirror designs, materials are selected to produce cost effective volume manufacture. The most suitable materials are normally polymeric or diecast metals. However, such materials generally have inadequate strength particularly in respect of bending or tensile loads. Accordingly, it has not been though possible to produce suitable and economic designs using these materials which can support significant cantilever loads.

Accordingly, it is an aim of this invention to produce a design which better resists the cantilever forces and to produce a design which is able to withstand higher forces using conventional materials.

SUMMARY OF THE INVENTION

In its broadest form, the invention is a wing mirror comprising:

A mirror head,

A vehicle mounting bracket,

A pivot assembly between said mirror head and said mounting bracket enabling the mirror head to pivotally rotate with respect to said mounting bracket, and;

Load support structure comprising a first surface on said mirror head and a second surface fixed with respect to said mounting bracket located over said first surface so that rotation of said mirror head about a horizontal axis is resisted by engagement of said first and second surfaces.

Preferably, the first surface is the upper surface of a flange on the mirror head and the second surface is the lower surface of a ledge fixed to the mounting bracket. The ledge on the mounting bracket is preferably supported some distance above the base surface of the mounting bracket. Other variations will be possible such as the first surface on the mirror head comprising one of the surfaces of a recess within the mirror head.

Preferably there is some clearance between the first and second surfaces to enable the mirror head to rotate freely. However, the clearance should be such that rotation of the mirror head about a horizontal axis does not allow significant side loading to be applied to the pivot means.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

In order to fully understand the invention, a preferred embodiment will be described, but it should be realized that the invention is not to be confined or restricted to the precise details of this embodiment. The embodiment is illustrated in the following figures in which.

DETAILED DESCRIPTION OF THE PREFERRED EMBODIMENTS

The following description of the preferred embodiments (s) is merely exemplary in nature and is in no way intended to limit the invention, its application, or uses.

Figure 1:
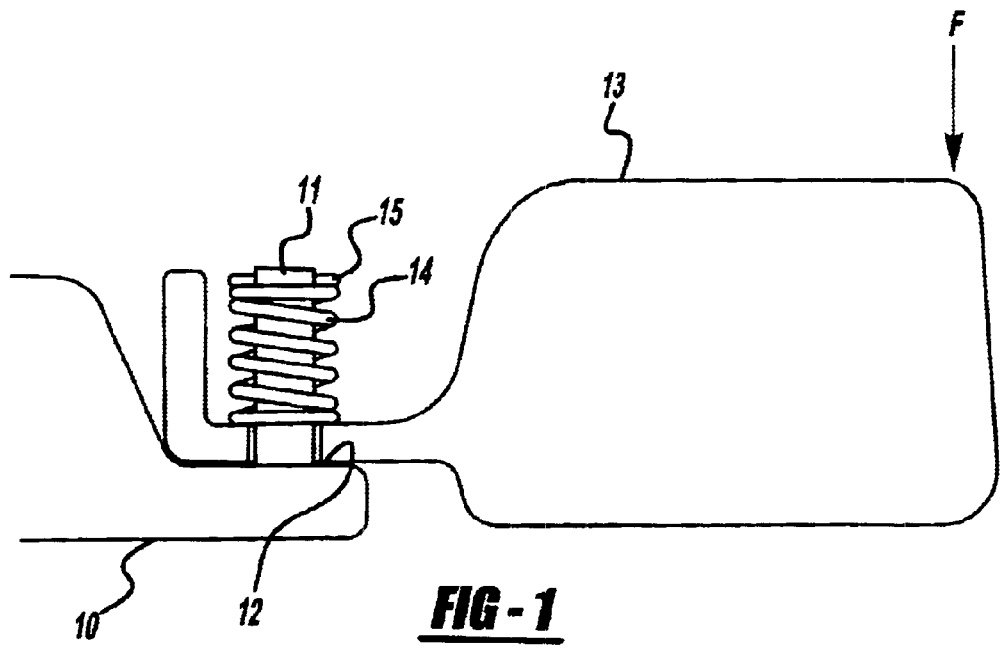
FIGS. 1 and 2 show a schematic representation of a conventional mirror head and bracket design with a cantilever force applied, and the resultant movement of the mirror head.

FIG. 1 illustrates a conventional mirror head and mounting bracket assembly. The mounting bracket 10 has a spigot 11 on a base surface 12. The mirror head 13 pivots with respect to the vertical axis of the spigot 11. A spring 14 is located around the spigot 11 and forces the mirror head 13 on to the base surface 12. A retainer 15 is used to hold the spring 14 in place on the spigot 11.

Figure 2:
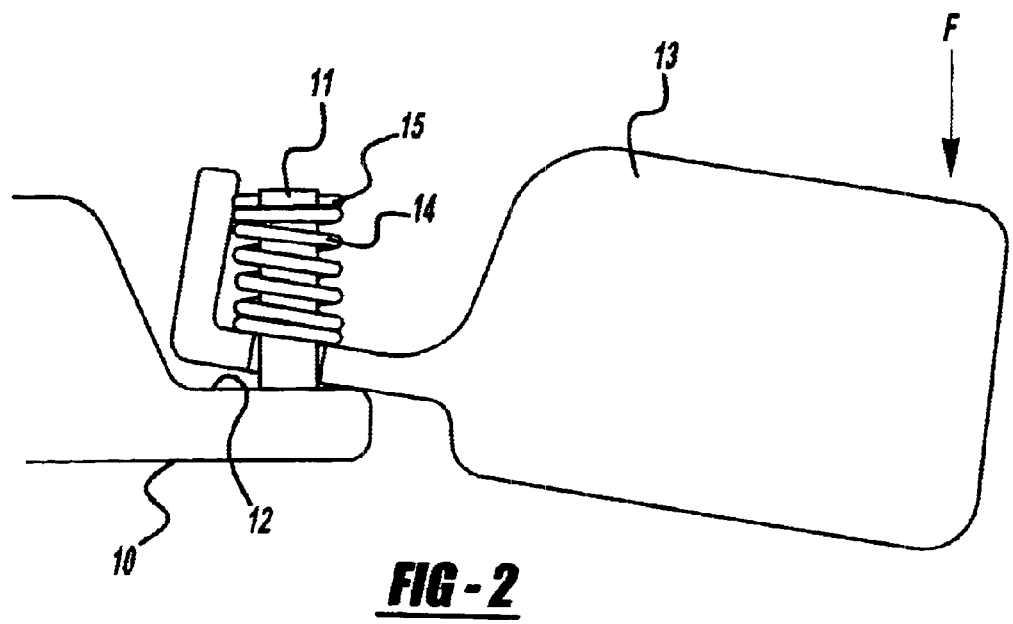

As shown in FIG. 2, a cantilever force F applied to the mirror head 13 will cause rotation of it about a horizontal axis. The pivot point for this rotation will be at the end of the mounting bracket at Point R.

If sufficient force is applied, the rotation of the mirror head 13 will cause compression of the spring 14, and may enable a portion of the mirror head 13 to come into contact with the spigot 11 or to indirectly apply load to the spigot 11 via the retainer 15. This can occur at any point along the spigot 11 such as the base or at its upper end. This then results in a side loading being applied to the spigot 11. Sufficient cantilever force can result in damage to the spigot or its complete failure.

Figure 3:
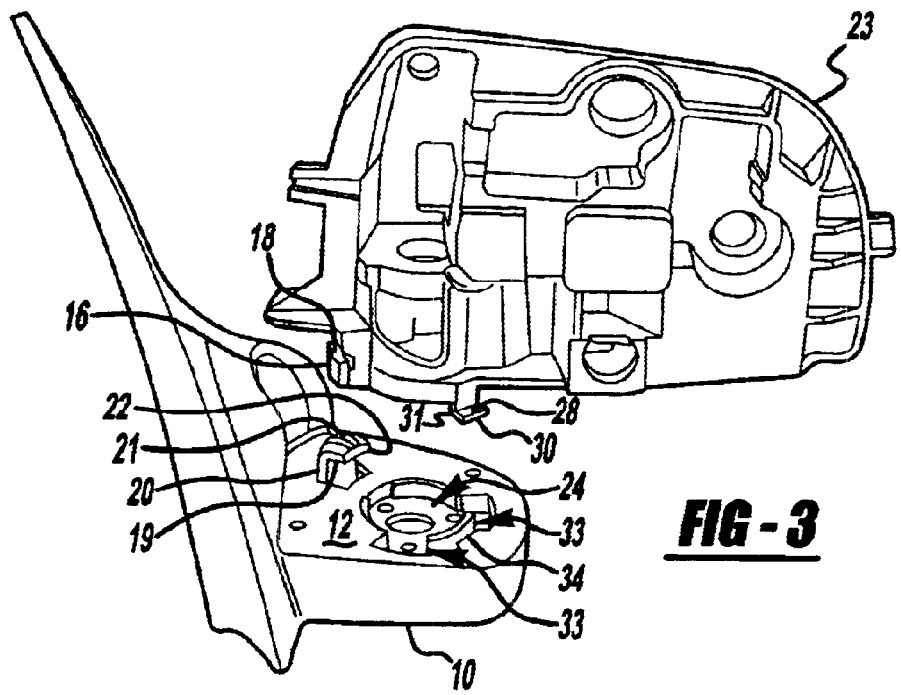
FIG. 3 shows an exploded perspective view of a mounting bracket and mirror head fitting that are pivotally connected and incorporate the invention.
Figure 4:
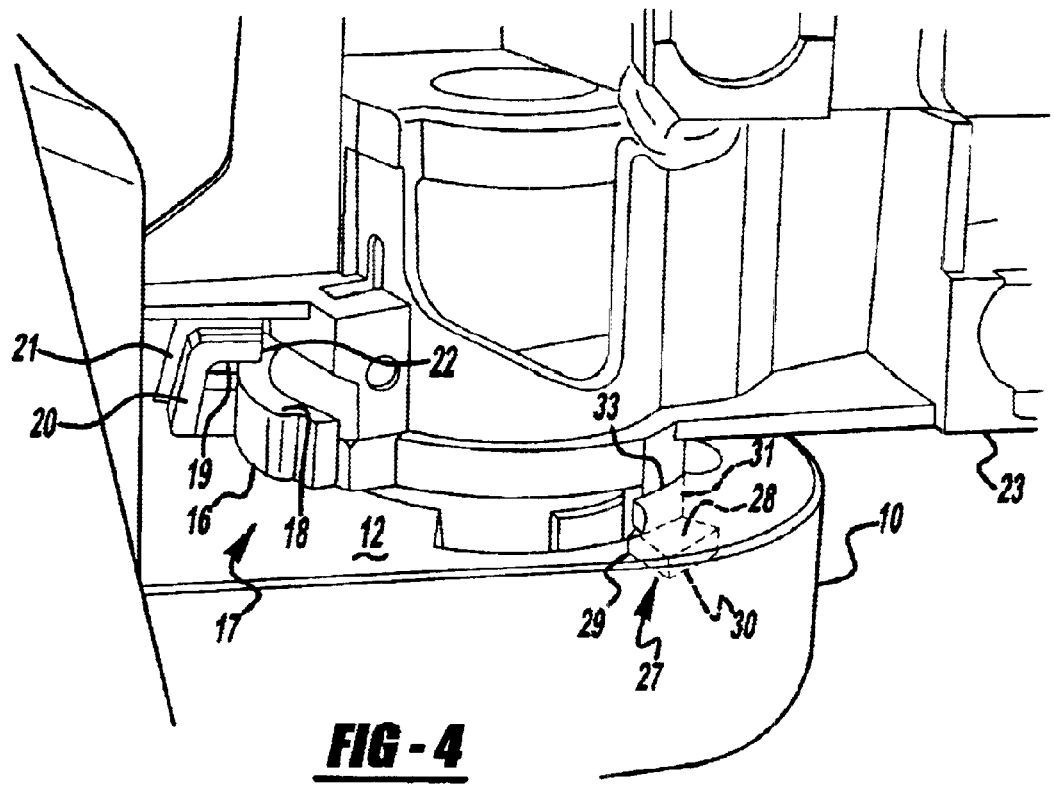
FIG. 4 shows a part perspective view of the mounting bracket and mirror head assembled.

In order to overcome this problem, the invention uses a load support structure 17 as illustrated in FIGS. 3 and 4. FIGS. 3 and 4 illustrate an internal structural member 23 which forms part of the mirror head 13 assembly. The mirror head cover and mirror plate have not been illustrated in FIG. 3 or 4 for the take of clarity. The internal member 23 is the component secured pivotally to the mounting bracket 10. The mirror head cove and mirror plate are in turn carried by the internal member 23.

In addition, the spigot has not been shown in FIGS. 3 and 4 for clarity. The spigot is secured within circular recess 24.

The load support structure 17, shown assembled in FIG. 4, comprises a first surface 18 on the internal member 23. This first surface 18 is the upper surface of a flange 16 which projects away from a portion of the internal member 23.

The mounting bracket 10 is provided with a second surface 19 that is located over the first surface 18. The second surface 19 is the lower surface of a ledge 22 that extends from a projection 20 where the projection 20 and second surface 19 are integrally moulded with the mounting bracket 10. The second surface 19 and base surface 12 comprise a channel through which the flange 16 in the mirror head locates so that the second surface 19 is located over the first surface 18.

Horizontal rotation of the mirror head and internal members 23 with respect to the mounting bracket 10 is limited by engagement of the first surface 18 with the second surface 19. Accordingly, any cantilever load applied to the outer end of the mirror head is transferred to the projection 20. The projection 20 can be reinforced by gussets 21 so that it can withstand much higher forces than could otherwise be resist if these loads were applied to the spigot.

A second load support structure 27 is provided to support uplifting force which may be applied to the mirror head. The second load support means 27 comprises a third surface 28 and a fourth surface 29 that abut to resist upward movement of the mirror head.

The third surface 28 is located on a ledge 30 that is supported by a projection 31. The ledge 30 and projections 31 extend below the internal member 23.

The base surface 12 of the mounting bracket 10 has a recess 33 that extends part way around the spigot recess 24. The projection 31 and ledge 30 located within the recess 33. A flange 34 extends part way into the recess 33 and does not extend to the ends of the recess 33. This provides the necessary aperture at either end of the recess 33 to locate the ledge 30 into the recess 33 and for it to located under the flange 34. The lower surface of the flange 34 comprises that fourth surface 29 which abuts against the third surface 29 on the ledge 30.

When the mirror head is in its deployed position, the ledge 30 is located directly below that flange 33. Any upward movement of the mirror head is thereby limited by engagement of the third and fourth surfaces 28 and 29.

Accordingly, this invention enables much higher cantilever loads to be supported by wing mirrors.

As seen in FIGS. 3 and 4, the width of the projection 20 and the recess 33 are such that the first and second surfaces 18 and 19 and third and fourth surfaces 28 and 29 will be engaged when the mirror head is in its normal deployed or in-use position. If the mirror head is rotated to a fully forward or fully rearward position, then the first surface 18 will be clear of the second surface and projection 19 and 20 and the ledge 30 will clear the flange 33. This will enable the mirror head to be fitted to the spigot 11.

Clearly, the invention is a simple and convenient way of providing a design which will withstand much higher cantilever loads.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A wing mirror comprising:
   a mirror head;
   a mounting bracket;
   pivot assembly between said mirror head and said mounting bracket enabling said mirror head to pivotally rotate with respect to said mounting bracket; and
   a load support structure comprising a first substantially planar surface formed on said mirror head and a second substantially planar surface formed on and fixed with respect to said mounting bracket, wherein said first surface extends radially outwardly away from an axis of rotation of said mirror head, wherein said second surface extends radially inwardly towards a central axis of said mounting bracket, wherein said second surface is located over said first surface so that rotation of said mirror head about a horizontal axis is resisted by engagement of said first and second surfaces.

2. A wing mirror according to claim 1 wherein said first and second surfaces are positioned to resist rotation caused by downward force applied to said mirror head.

3. A wing mirror according to claim 2 further comprising a third surface on said mirror head and a fourth surface in said mounting bracket that locates over said third surface so that rotation of said mirror head caused by an upward force being applied to said mirror head is resisted by engagement of said third and fourth surfaces.

4. A wing mirror according to claim 3 wherein said mounting bracket has a base surface and is at a right angle with respect to the axis of rotation of said mirror head, against which a surface of said mirror head locates.

5. A wing mirror according to claim 4 further comprising a projection extending below said mirror head surface and a ledge on said projection where the upper surface of said ledge comprises said third surface.

6. A wing mirror according to claim 5 further comprising a recess in said base surface and said mirror bracket and a flange extending partly into said recess, a lower surface of said flange comprising said fourth surface.

7. A wing mirror according to claim 6 wherein said projection and ledge on said mirror head locates into said recess when said mirror head is in a predetermined position whereupon rotation of said mirror head results in said ledge locating under said flange and said first surface locating under said second surface.

8. A wing mirror according to claim 1 further comprising a flange on said mirror head where an upper surface of said flange comprises said first surface.

9. A wing mirror according to claim 8 further comprising a ledge on said mounting bracket where a lower surface of said ledge comprises said second surface.

10. A wing mirror according to claim 1 further comprising a ledge on said mounting bracket where a lower surface of said ledge comprises said second surface.

11. A wing mirror according to claim 10 wherein said mounting bracket has a base surface that is at a right angle with respect to the axis of rotation of said mirror head, said ledge being spaced from said base surface to form a channel within which said flange locates.

12. A wing mirror according to claim 11 wherein said ledge is supported above said base surface by a projection.

13. A wing mirror according to claim 10 wherein said ledge and said flange are arcuate and are positioned so that said first and second surface can engage principally when said wing mirror is in its in-use position.

14. A wing mirror comprising:

a mirror head;

a mounting bracket;

pivot assembly between said mirror head and said mounting bracket enabling said mirror head to pivotally rotate with respect to said mounting bracket;

load support structure comprising a first surface on said mirror head and a second surface fixed with respect to said mounting bracket located over said first surface so that rotation of said mirror head about a horizontal axis is resisted by engagement of said first and second surfaces; and a third surface on said mirror head and a fourth surface in said mounting bracket that locates over said third surface so that rotation of said mirror head caused by an upward force being applied to said mirror head is resisted by engagement of said third and fourth surfaces;

wherein said first and second surfaces are positioned to resist rotation caused by downward force applied to said mirror head.

15. A wing mirror according to claim 14 wherein said mounting bracket has a base surface that is at a right angle with respect to the axis of rotation of said mirror head, against which a surface of said mirror head locates.

16. A wing mirror according to claim 15 further comprising a projection extending below said mirror head surface and a ledge on said projection where the upper surface of said ledge comprises said third surface.

17. A wing mirror according to claim 16 further comprising a recess in said base surface of said mirror bracket and a flange extending partly into said recess, a lower surface of said flange comprising said fourth surface.

18. A wing mirror according to claim 17 wherein said projection and ledge on said mirror head locates into said recess when said mirror head is in a predetermined position whereupon rotation of said mirror head results in said ledge locating under said flange and said first surface locating under said second surface.

* * * * *